United States Patent
Jaeger et al.

(10) Patent No.: US 6,270,910 B1
(45) Date of Patent: Aug. 7, 2001

(54) ANISOTROPIC FILM

(75) Inventors: Jobst Tilman Jaeger, Kaarst (DE); Alan J. Sipinen, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/055,173

(22) Filed: Apr. 3, 1998

(51) Int. Cl.[7] .............. B32B 27/00; B32B 27/08; B32B 27/06; C08L 23/00
(52) U.S. Cl. ............ 428/500; 428/474.4; 428/480; 525/240
(58) Field of Search ............... 442/328, 333, 442/334; 525/240; 428/323, 327, 411.1, 474.4, 480, 500, 515

(56) References Cited

U.S. PATENT DOCUMENTS

| | | | |
|---|---|---|---|
| 5,272,236 | 12/1993 | Lai et al. | 526/348.5 |
| 5,344,691 | 9/1994 | Hanschen et al. | 428/152 |
| 5,354,597 | 10/1994 | Capik et al. | 428/152 |
| 5,462,708 | 10/1995 | Swenson et al. | 264/174.11 |
| 5,472,775 | 12/1995 | Obijeski et al. | 428/220 |
| 5,501,679 | 3/1996 | Krueger et al. | 604/393 |
| 5,514,470 | 5/1996 | Haffner et al. | 428/246 |
| 5,527,304 | 6/1996 | Buell et al. | 604/385.2 |
| 5,824,411 | * 10/1998 | Shalaby et al. | 428/364 |
| 5,861,463 | * 1/1999 | Sehanobish et al. | 525/240 |
| 5,885,908 | * 3/1999 | Jaeger et al. | 442/59 |

FOREIGN PATENT DOCUMENTS

| | | | |
|---|---|---|---|
| 0 015 556 | 9/1980 | (EP) | C08L/23/00 |
| 0 707 106 | 4/1996 | (EP) | D04H/13/00 |
| 0 712 892 | 5/1996 | (EP) | C08L/23/16 |
| 59-155478 | 9/1984 | (JP) | C09J/7/00 |
| 8-58038 | 3/1996 | (JP) | B32B/27/30 |
| 2-182454 | 1/1998 | (JP) | B29C/47/06 |
| WO 95/33006 | 12/1995 | (WO) | C08L/53/02 |
| WO 97/10300 | 3/1997 | (WO) | C08L/23/14 |

OTHER PUBLICATIONS

Ehtaiatkar et al., "In situ production of polyethylene fibres from polymer blends," Journal of Materials Science, 24, pp. 2808–2814, (1989).

Folkes et al., "S–B–S block copolymer–polystyrene blends: 1. Morphology and swelling properties," Polymer, 27, (1986).

Robeson et al., "Microfiber Formation: Immiscible Polymer Blends Involving Thermoplastic Poly (vinyl alcohol) as an Extractable Matrix," Journal of Applied Polymer Science, vol. 52, pp. 1837–1846, (1994).

Dreval et al., "Deformation of melts of mixtures in incompatible polymers in a uniform shear field and the process of their fibrillation," Rheol. Acta 22, pp. 102–107, (1983).

Steadman, "Fibre forming blends and in situ fibre composites," Polymer Blends and Alloys, pp. 229–255.

Flosenzier et al., Polymer Engineering and Science, vol. 30, No. 1, pp. 50–58 (1990).

Sims, "Injection Moulding Applications of ENGAGE resins," presented at New Plastics 96 Conference, Oct. 30, 1996, Strasbourg, France.

Seguela et al., "Molecular topology in ethylene copolymers studied by means of mechanical testing," Journal of Materials Science, 23, pp. 415–421, (1988).

Burfield et al., "DSC studies of linear low density polyethylene. Insights into the disrupting effect of different comonomers and the minimum fold chain length of the polyethylene lamallae," Makromol. Chem. 1986, pp. 2657–2662, (1985).

Flory, "On the Morphology of the Crystalline State in Polymers," pp. 2857–2867 (1962).

Wunderlich, Macromolecular Physics, vol. 3, Crystal Melting, pp 260–263. (1980).

Product Brochure, Engage® Polyolefin Elastomer, (1996).

Research Disclosure, 17745 Fibre–Reinforced Elastomers, p. 19, (1979).

AIBU Technology, Miscellaneous Product Information for Exact® Plastomers, 6 pages, (Mar. 1997).

AIBU Technology, Miscellaneous Product Information for Exact® Plastomers, 2 pages, (Feb. 1997).

DuPont Dow, Miscellaneous Product Information for Engage® Polyolefin Esastomer, 1 page (Apr. 1, 1996).

* cited by examiner

*Primary Examiner*—Paul Thibodeau
*Assistant Examiner*—Sheeba Ahmed
(74) *Attorney, Agent, or Firm*—Gary L. Griswold; Robert W. Sprague; William J. Bond

(57) ABSTRACT

Described are anisotropic films comprising a continuous elastic phase comprising a polyolefin elastomer; and a discontinuous phase oriented within the continuous phase such that the film exhibits anisotropic properties.

14 Claims, No Drawings

ANISOTROPIC FILM

FIELD OF THE INVENTION

The invention relates to anisotropic films having a continuous phase and a discontinuous phase.

BACKGROUND

Elastic film materials, nonwovens, and other similar films have many industrial and consumer uses. Among other uses, such materials are frequently used, for example, in the disposable or personal use garment product area, garment meaning a product used on or in association with a body (human or animal). Specific such uses include disposable diapers, training pants, incontinence articles, sanitary napkins, bandages, surgical drapes and gowns, medical nonwovens, face masks, sport wraps and the like.

Generally, elastic films and materials can be formed from materials which exhibit elastic properties in substantially all directions. However, for some applications it is desirable to have materials which are primarily elastic in only a single direction, i.e., materials that are anisotropically elastic. A large amount of work, and a large number of patent applications and patents have been directed toward providing such anisotropically elastic materials, with a wide variety of solutions being provided.

A number of approaches have been successful in providing anisotropic elastic films. One common approach has been to laminate an elastic web material to a second web material that is easily stretched in one direction but not in the transverse direction. To produce these "stretch-bonded laminates," an elastic film or nonwoven materials, or a similar type of elastic web, is elongated in one direction. While elongated, the elastic web is either continuously-bonded or point-bonded to an inelastic web material. Afterwards, tension is released and the elastic web is allowed to recover from its elongation. The attached inelastic web material then puckers making the stretch-bonded laminate readily extensible in the direction of the elastic web's elongation but not in the transverse direction. The laminate can then be restretched up to the point of previous elongation of the elastic web. This is not a universal solution, however, because the described puckering can be undesirable for some applications.

In order to eliminate puckering, inelastic nonwoven web materials have been prepared with a large number of substantially parallel slits. This slit nonwoven web material can be attached to an untensioned elastic web material. When the laminate is stretched in a direction perpendicular to the direction of the slits the laminate stretches and recovers without the formation of puckers or gathers in the inelastic nonwoven web.

Some approaches to preparing anisotropic materials do not involve bonding an elastic material to a non-elastic material. For example, anisotropic behavior can be obtained in an elastomeric nonwoven fibrous web of meltblown elastomeric fibers by aligning the fibers with an airstream to produce a web with a higher peak load tension in the direction of fiber orientation.

Even with the existence of the above-described solutions, as well as others, there still exists a continuing need for new constructions of such films. Preferably the films should be easy to manufacture, form readily into a roll, can be subsequently easily unwound without substantial blocking, and can be handled and converted into a final form for use, e.g., on a limited-use garment.

SUMMARY OF THE INVENTION

The present inventors have identified films that exhibit useful anisotropic properties. The anisotropic films can be useful in various applications where elastic film properties are desired, and are particularly useful in applications where anisotropic film properties are desired; e.g., where elasticity in one direction is desirable with relatively higher tensile strength desired in a perpendicular direction. Relatively higher tensile strength can be desirable, for example, when it is necessary for processing to roll a film onto a core to form a larger roll, where winding, unwinding, and any further processing can preferably be accomplished with little or no stretching of the film.

An aspect of the invention relates to anisotropic film having a continuous elastic phase comprising a polyolefin elastomer, and a discontinuous phase within the continuous phase. The film can be used by itself or in combination with other materials as a laminate material, e.g., for personal use garments.

As used herein, the term "anisotropic," refers to a film that exhibits elasticity and strength properties that are different when measured in one direction than in a second direction. The directions of measurement are conventionally referred to, e.g., as a "machine direction," "MD," or "inelastic direction," and a direction perpendicular to the machine direction, referred to as a "cross direction," "CD," or "elastic direction." Elasticity and strength properties can be measured by a number of different physical properties of a film, including one or more of tensile strength, permanent set or set, and elastic force, etc. These properties are referred to herein as "film properties."

The term "elastic" as used within the present description will be given meaning as generally accepted in the elastic materials art, not inconsistent with the following: in terms of permanent set, an elastic material can be defined to recover at least about 80 percent of its stretched length after extension of 100% strain (double its initial length).

DETAILED DISCLOSURE

The present invention relates to substantially anisotropic film comprising a continuous phase and a discontinuous phase.

The continuous phase (also referred to herein as the "elastomeric phase") comprises an elastomeric polyolefin. This continuous elastomeric phase provides the inventive film with elastic properties, and the elastomeric polyolefin can comprise any of a number of polyolefin materials that exhibit elastic behavior. The elastomeric polyolefin can have any degree of elasticity which, in combination with the discontinuous phase, provides a film having substantially anisotropic film properties as desired for a particular application. Preferably, in terms of permanent set, a film of the elastomeric polyolefin can recover at least about 80 percent of its stretched length after extension of 100% strain (double its initial length), more preferably about 50 percent, and even more preferably below about 30 or 20 percent.

The elasticity of the elastomeric polyolefin can exhibit a correspondence to the density of the elastomeric polyolefin (see below). Although ranges outside of the following might be useful in combination with a given discontinuous phase, and for a specific application, it can be said that in general an elastomeric polyolefin (e.g., a polyethylene polymer or copolymer) having a density below about 0.92 grams per cubic centimeter (g/cc) can be useful, with a density below about 0.90 g/cc being preferred, and densities below 0.89 g/cc being particularly preferred.

The elastomeric polyolefin can be any elastomeric polyolefin as described above, which can be used in combination with the discontinuous phase material described below to prepare a substantially anisotropic film.

While wishing not to be bound by theory, the cause of the elastomeric character of elastomeric polyolefins has been attributed to the chemical structure of such polyolefin polymers, and to the low density crystalline structure that polymers of specific chemical composition assume within a polymeric film. Numerous documents describe this phenomena and examples of polymeric structures that are capable of achieving such low density crystalline structure. See for example Jacob Sims of Dow DuPont Elastomers article, "Injection Moulding Applications of ENGAGE resins," presented at New Plastics 96 Conference, Oct. 30, 1996, Strasbourg, France, the disclosure of which is incorporated herein by reference. This article describes elastomeric polyolefins as having narrow molecular weight distribution and narrow composition distributions, together with controlled amounts of long chain branching, which can combine to create a crystalline structured polyolefin having desired density and elastomeric properties. See also the descriptions of polyolefin elastomers and their methods of production in U.S. Pat. Nos. 5,472,775, and 5,272,236, European Patent Application EP 0 712 892 A1, and PCT International Patent Application Numbers WO 97/10300 and WO 95/33006, the disclosures of each of which are incorporated herein by reference.

Elastomeric polyolefin materials can be prepared by methods known in the elastomeric materials art, and described in such references as those listed in the above paragraph. For example, elastomeric polyolefins can be prepared by reacting olefinic monomers or comonomers to produce a "homogeneously branched" ethylene polymers, as described, e.g., at pages 9 through 14 of PCT International Publication Number WO 95/33006 (International Application Number PCT/US95/06903). Therein it is described that elastomeric ethylene/alpha-olefin copolymers can be prepared by conventional polymerization processes using Ziegler-type catalysts (e.g., zirconium and vanadium catalysts) as well as metallocene catalyst systems.

It is further understood that elastomeric polyolefin polymers such as those described in U.S. Pat. No. 5,472,775 can be a homopolymer or copolymer prepared from suitable unsaturated monomers or comonomers including, for example, ethylenically unsaturated monomers which can be straight chain (alkylenes such as ethylene, propylene, etc.) or cyclic (e.g., 2-norbornene), conjugated or non-conjugated dienes, polyenes, etc. Specific examples of suitable monomers and comonomers include $C_2$–$C_{20}$ alpha olefins such as ethylene, propylene, isobutylene, 1-butene, 1-hexene, 4methyl-1-pentene, 1-heptene, 1-octene, 1-nonene, 1-decene, etc. For polyethylene elastomeric copolymers the density of the copolymeric material, and therefore its elastomeric properties, can be related to the amount of comonomer reacted with the ethylene monomer in that an increase in comonomer (e.g., a non-ethylene alpha-olefin) will generally decrease the density of the copolymeric material.

Examples of "metallocene" catalysts that can be used in the preparation of elastomeric polyolefins include those described in U.S. Pat. No. 5,272,236 and PCT International Patent Application Number PCT/US96/14847 (International Publication Number WO 97/10300), those commercially available under the trade name INSITE™ catalysts from Dow DuPont, as well as other metallocene catalysts that are commercially available from other commercial sources.

Elastomeric polyolefins are also commercially available, for example: from Exxon Chemicals under the trade name of DEX Plastomers, e.g., EXACT 3000 and 4000 series plastomers, SLP-9000 and SLX-9000 series plastomers, and 2M004, 2M005, 2M007 series plastomers; from Mitsui Chemical Company under the trade name TAFMER; from Dow Chemical Company under the trade name AFFINITY elastomers; and from Dow DuPont Elastomers under the trade name ENGAGE®, e.g., ENGAGE 8000 series polyolefin elastomers.

The discontinuous phase of the anisotropic film can comprise a polymeric material such as a polymer that is less elastic than the elastomeric polymer of the continuous phase, and that can exist within the continuous phase in a discontinuous phase oriented to cause anisotropic film properties. To provide anisotropic properties, the discontinuous phase can be present within the continuous phase in discontinuous domains that are oriented to produce different elastic and/or tensile properties in a first direction compared to such properties in a second direction (e.g., in a perpendicular direction). For example, the discontinuous phase can exist as substantially long and narrow, discontinuous, fiber-like domains present within the continuous phase. Such domains of the discontinuous phase can also be referred to herein as "fibers." If fibers of the discontinuous phase are oriented randomly, the film should exhibit substantially similar properties when tested in any direction. If the fibers are oriented to some extent in a non-random configuration, e.g., comprise fibers that tend to exhibit an overall alignment in reference to their length-wise axis, or are preferably to some extent parallel with respect to their lengthwise axis, more preferably substantially parallel, then the relatively less elastic fiber phase increases tensile properties in the direction of their lengthwise orientation, while properties in the direction perpendicular to the direction of substantial orientation will be dominated by the properties of the continuous elastic phase, thus causing the film in that perpendicular direction to exhibit properties which are relatively more elastic.

To provide an anisotropic film, the discontinuous phase, the fibers, are situated within the continuous phase and oriented to a degree at least sufficient to provide increased strength and reduced elasticity in the direction of orientation as compared to the direction perpendicular to such orientation.

Preferred materials for the discontinuous phase can include materials that have similar melting properties as the continuous phase to facilitate processing by preferred methods such as extrusion, as described below, and that are not miscible with the continuous phase (also for ease of processing). Preferred materials for use as the discontinuous phase include polystyrene, polyamide, polyesters such as polybutylene terephthalate (PBT), and mixtures thereof. Such materials are known in the chemical materials art, and are commercially available, for example, under the following trade names: Pocan 1300, 1600 from Bayer, PS 144 c glasklar from BASF, PA12 from EMS (Grilamid L20G), PP7060S from Fina, LDPE Finathene LB520-0.

The film should contain a sufficient amount of the discontinuous phase to allow the discontinuous phase, when properly oriented, to cause the film to exhibit anisotropic behavior. The exact composition of the film and the amount of discontinuous phase relative to continuous phase can depend on numerous factors, including the desired strength and elasticity properties of the anisotropic elastic film, and the degree to which these properties vary anisotropically. It can be desired to consider the effect of film composition on more than one of the properties of strength and elasticity, and in more than one direction. That is, it might be important to find a balance of strength and elasticity in a combination of film directions (e.g., machine and cross directions). As an example, it may be important to consider that increasing the strength of a film in the machine direction can cause an increase of the elastic force and the permanent set in the cross direction due to a filling effect caused by replacement of the elastomeric polymer with the inelastic material of the inelastic phase.

When using the preferred extrusion techniques described below to prepare the anisotropic film, processing considerations may be the limiting factor defining the amount of discontinuous phase present in an anisotropic film. Specifically, when the materials of the continuous and discontinuous phases are extruded to form a film, the material of the discontinuous phase must generally comprise less than half of the film materials in order to be discontinuous. By extrusion methods, the use of about 45 percent of one phase can allow that material to constitute a fibrous discontinuous phase. And, although amounts outside of this range might also be desirable, preferred amounts of the discontinuous fiber phase within a given anisotropic film have been found to be in the range from about 1 to 40 parts by weight (pbw) discontinuous phase per 100 parts by weight the anisotropic film (defined for this purpose to be the weight of the discontinuous phase plus the weight of the continuous elastic phase), with the range from about 20 to 30 pbw discontinuous phase per 100 pbw film being preferred.

The anisotropic film of the invention can also include other components known to be useful in the art of films and elastomeric materials. For instance, it may be desirable to add an antiblocking material to prevent the film from blocking to itself when in a rolled configuration. Examples of such an antiblocking material include calcium carbonate such as Omyalene G200, commercially available from OMYA GmbH, Koeln, Germany. Release agents such as fluoropolymers, silicones, stearates, etc., can be added to or coated onto the anisotropic film, or a laminate thereof, e.g., in order to improve processing if the film or laminate. Additionally, any other additives can be included, such as standard additives including dyes, pigments, antioxidants, antistatic agents, bonding aids, heat stabilizers, photostabilizers, foaming agents, glass bubbles, and the like. The amounts of such materials that can be useful in a film will be easily determined by those skilled in the art of such films and elastomeric materials.

The thickness of the anisotropic film can be a function of the desired elastic and tensile properties of the film, and of the application for which the film is designed. Thus, the film can be of generally any thickness that will provide a useful anisotropic, elastic film. In general, and although ranges outside of the following can still be useful, most applications call for films of a thickness in the range from about 20 to 300 micrometers ($\mu$), with the range from about 25 to 100 $\mu$ being preferred.

Film properties and the degree to which they are anisotropic can be to some extent chosen to fit the specific needs for a desired elastic film product. Preferably, in the cross direction of the film, the film is sufficiently elastic that the 50% permanent set value is less than about 20%, more preferably less than about 10%, and the 100% permanent set value is preferably less than about 60%, more preferably less than about 30%. In the machine direction the F10 force is preferably at least about 6 newtons, and is more preferably at least about 10 newtons per 100 microns. An anisotropic film of the invention having a discontinuous fibrous phase dispersed within a continuous phase will be referred to as "substantially anisotropic" if the film exhibits anisotropic properties that are enhanced versus a similarly-prepared homogeneous film comprised only of the continuous phase. The ratio of F10 in the machine direction versus F10 in the cross direction is preferably at least about 1.5, more preferably at least about 2, and even more preferably at least about 3.

The anisotropic film can be prepared from the materials of the continuous and discontinuous phases by any method that will provide a film having the discontinuous fibrous phase present within the continuous elastic phase in discontinuous domains properly shaped and oriented to provide a film having anisotropic properties. Generally, such a film can be produced by appropriately melting and casting the different components of the film to achieve such a result. Preferred methods of preparing the anisotropic film include extrusion methods, coextrusion methods, and blown film extrusion methods, all of which are well known in the art of producing films. In extrusion methods, the materials of the continuous and discontinuous film can be nixed together and melted by feeding them into one or more rotating screw extruders. The extruders then feed into a die or feedblock through which a die tip forms the extruded elastic film comprising a desired continuous elastic phase, with a desired discontinuous phase situated within the continuous phase as substantially parallel oriented fibers. As is well known, the extruded film can be cast upon a roller and the temperature reduced. Coextrusion methods and coextrusion/lamination methods, each of which are also well known, can be used to provide an anisotropic film laminate of the anisotropic film and one or more additional film layers laminated thereto. Also optionally, further processing such as additional stretching of the anisotropic film can be used if desired to further orient the film.

The anisotropic film material can be incorporated into multilayer products wherein the anisotropic film comprises an elastic layer in a multilayer film construction, such as can be understood from the disclosures of U.S. Pat. Nos. 5,501, 675, 5,462,708, 5,354,597, or 5,344,691, the disclosures of which are incorporated herein by reference. These references teach various forms of multilayer coextruded elastic laminates with at least one elastic core layer and one or two relatively inelastic skin layers. The skin layers can be stretched beyond an elastic limit of these layers (i.e., permanently deformed) and the coextruded laminate subsequently recovered in the direction opposite the stretching direction by the relatively higher elastic recovery of the elastic core layer. The result is the formation of a material which is selectively elastic in only those regions which are stretched and recovered. The skin layers recover little or at least less than the elastic core and can be designed to form a microtexture or microstructure. Microtexture or microstructure means that the skin layer contains irregularities or folds (e.g., peaks and valleys) which are large enough to be perceived by the unaided human eye as causing increased opacity over the opacity of a laminate before stretching and recovery. The irregularities are small enough to be perceived as smooth or soft on human skin and magnification is required to see the details of the microtexturing.

The skin layers are generally formed of any semicrystalline or amorphous polymer which is less elastomeric than the elastic core layer and which will undergo relatively more permanent deformation than the core layer at the percentage that the elastic laminate is stretched. Elastomeric materials such as olefinic elastomers, e.g., ethylene-propylene elastomers, ethylene propylene diene polymer elastomers, metallocene polyolefin elastomers, or ethylene vinyl acetate elastomers, alone, in combination, or in combination with inelastic materials, can be used as long as the skin layers provided are substantially less elastomeric than the elastic core layer. Preferably, these skin layers are polyolefinic formed predominately of polymers such as polyethylene, polypropylene, polybutylene, polyethylene-polypropylene copolymer. However, these skin layers may also be wholly or partly polyamide, such as nylon, polyester, such as polyethylene terephthalate, or the like, and suitable blends thereof. Generally, the skin layer material following stretching and elastic recovery is in contact with the elastic core layer material in at least one of three suitable modes: first, continuous contact between the elastic core layer and the microtextured skin layer, second, continuous contact between the layers with cohesive failure of the core layer material under the microtextured skin folds; and third, adhesive failure of the skin layer to the core layer under the microtextured folds with intermittent skin layer to core layer contact at the microtexture fold valleys. Generally, in the context of the present invention, all three forms of skin-to-core contact are acceptable. However, preferably the skin and core layers are in substantially continuous contact so as to mime the possibility of delamination of the skin layer(s) from the elastic core layer.

Generally, the core layer to skin layer thickness ratio will be at least 3, preferably at least 5 but less than 100, and most preferably from 5 to 75.

The addition of the skin layer materials, as described in the above references, generally tends to further reinforce the anisotropic elastic film material layer in the machine direction. Also, following stretching and recovery in the cross direction (CD), the multi-layer film material exhibits substantially identical CD elastic properties to the elastic film core layer itself As such, the CD stretched and recovered version of this multi-layer film exhibits enhanced anisotropic elastic behavior. However, prior to stretching and recovery the film generally is inelastic in both MD and CD directions.

The anisotropic elastic behavior in these coextruded laminates using the invention anisotropic film layer(s) can be accentuated as described in U.S. Pat. No. 5,462,708 by subjecting a uniaxially stretched laminate to a deactivating heat treatment, while in the stretched condition. The heat treatment is such that the elastic recovery force of the elastic material is allowed to dissipate without substantially affecting the orientation of the inelastic skin materials. The heat treated laminate material is then stretched in a second cross direction and allowed to recover as described above. The resulting material is exceedingly strong in the original stretch direction and elastic in the cross direction. Machine direction orientation can also be used with other embodiments, with or without heat treatment, to provide additional anisotropic behavior to the invention anisotropic film material. This machine direction orientation can be up to the natural draw ratio of the fiber forming polyolefins of the inelastomeric polymer material portion. Generally this can be an orientation of up to six (6) times the original length of the film, although preferably from 2 to 5 times the original film length.

In an additional embodiment, an extremely thin skin layer can be employed such that the multilayer elastomeric material exhibits substantially complete elastic properties when initially stretched in the CD direction, rather than requiring initial stretch and recovery. The use of such a thin skin layer generally decreases the potential for the anisotropic film to block when formed into a roll. However, these skin layers are generally not required for that purpose. If skin layers are used, the elastic film layer can contain additional materials in the elastomer portion that might otherwise increase the film layer's tackiness and as such its tendency to block. Such additives would include diblock copolymers, other tack-modifying elastomers such as polyisoprenes, tackifiers, oils, liquid or low molecular weight resins, and the like. These tack-modifying materials can assist in the skin layer to core layer adhesion or could be used to modify elastomeric properties, extrusion properties, or be used as extenders.

The invention anisotropic elastic film can also be used extensively in laminates with other film layers or nonwoven web materials or other webs such as is known in the art. For example, the anisotropic elastic film can be directly extrusion bonded to a nonwoven material which is extensible in at least the cross direction or alternatively either adhesively or thermally continuously bonded or point bonded to such a web material. Examples of such cross directionally extensible nonwoven web materials include the neckable spunbond, meltblown or bonded carded webs disclosed in U.S. Pat. No. 5,514,470. These neckable nonwoven webs can be stretched in the machine direction, for example to 150 percent elongation, such that the nonwoven web substantially and reversibly necks in the cross direction, and can then be joined to the elastic film layer while so necked. The resulting laminate is generally tensilized in the machine direction while generally elastically extensible in the cross direction. Alternatively, a nonwoven web or film could be corrugated in the cross direction by use of corrugating rolls and subsequently joined to the invention anisotropic elastic film. Certain other nonwoven materials such as some spunlace nonwovens or spunbond nonwovens formed with crimped or crimpable fibers exhibit a natural tendency to elongate in the cross direction.

If the anisotropic film material is directly extrusion coated onto a nonwoven material, the nonwoven is generally contacted with the film less than about 2 seconds after the film has been extruded from the die tip so as to contact the nonwoven while it is still substantially in a heat softened state.

The invention anisotropic elastic film, whether a single layer film, a multi-layer film, or a laminate, can be used extensively in disposable or limited use garments and the like requiring an elastic that exhibits generally cross directional elasticity. For example, the material can be used extensively as an elastic in a disposable diaper such as waist band elastic, elastic side panels, or elastic ear portions or in disposable training pants requiring specific zones of elasticity in order to create a tight-fitting, conformable garment. When used, the invention anisotropic elastic film material would generally be unwound from a roll and cut into suitable sizes and shapes for use in elasticating the disposable garment. The relatively inelastic behavior of the anisotropic film in the machine direction enables the film to be more easily handled and cut into specific forms on conventional film handling machinery without undesirable elongation of the elastic (e.g., causing loss of film tension on the manufacturing line) in the machine direction. The invention material, when cut into appropriate shapes, can be applied in a conventional manner as is known in the art.

TEST METHODS

Measurement of F10 and F10 Ratio

Strips of elastomeric film measuring 2.54 cm by 15 cm by approximately 50–100 micron thick were cut along both the machine direction (MD) and cross direction (CD) of an extruded film sheet. The force required to stretch the samples 10 percent (the F10 force) was measured using a standard tensile test configuration as described in ASTM D 882–95a. Thethe value received was normalized by dividing it by the sample thickness and multiplying that result by 100.

The F10 ratio is the dimensionless number calculated by dividing the F10 force required for stretching the elastomeric film 10 percent of its original length in the machine direction divided by the F10 force in the cross direction.

2. Permanent Set

Samples of elastomeric film were cut into strips having a width of 2.54 cm, a length of 15 cm, and thickness of approximately 50–100 micron.

The film samples were stretched to a defined percent (50 percent or 100 percent) of their original length and then allowed to recover. The tendency to recover completely or remain partially extended after stretching was determined quantitatively by measuring permanent set in percent. The test was performed using a tensile tester and test sample arrangement as described in ASTM D 882–95a, Tensile Properties of Thin Plastic Sheeting. Elastomeric film samples were extended to 50 percent and 100 percent of their original lengths and were then allowed to relax; the length of each sample was immediately measured to determine the permanent set tests, with the results then being averaged.

The difference in length before and after extension was divided by the original length and expressed as percent as the permanent set.

MATERIALS

Continuous phase polymers

B1 Polyethylene, density .0.863, available as ENGAGE 8180 from Dow DPont Elastomers SA, Geneva Switzerland.

B2 Polyethylene, density 0.868, available as ENGAGE 8150.

B3 Polyethylene, density 0.870, available as ENGAGE 8100.

B4 Polyethylene, density 0.88., available as ENGAGE 8003.

B5 Polyethylene, density 0.908, available as ENGAGE 8480.

B6 Polyethylene, available as Finathene LB520-0 with a density of 0.922 from Fina Chemicals, Brussels, Belgium.

Fiber-forming incompatible phase materials

F21 Polystyrene, available as Polystyrol 144 CKG-2 from BASF-Ludwigshafen.

F21 Polyamide PA12, available as GrilamidL20 natur from EMS Chemie AG Domat, Switzerland.

F23 Polybutylene terphthalate, available as POCAN B-1300 from Bayer, Leverkusen, Germany.

F24 Polybutylene terphthalate, available as POCAN B-1501 from Bayer, Leverkusen, Germany.

Non Fiber forming compatible materials

C25 Polypropylene, available as Finapro PPH 7060S from Fina Chemicals, Brussels, Belgium.

Additives/Other

A51 $CaCO_3$ masterbatch available as Omyalene G200 from OMYA GmbH Koehn, Germany.

Example 1

An elastomeric film was prepared by extrusion using a single-screw extruder having a screw diameter of 45 mm and a length/diameter ratio of 30:1, commercially available from Plastikmaschinenbau, Kehlberg, Germany. The barrel was heated in 5 zones to temperatures of .210, 220, 230, 235 and 240° C., respectively, the temperature in the die had a temperature of 220° C.

Polyethylene pellets having a density of 0.863 g/cm$^3$ (70 parts, available as ENGAGE 8180 from Dow DuPont Elastomers, denoted as B1), polystyrene pellets (25 parts, available as Polystyrol 144 CKG-2 from BASF, denoted F21), and $CaCO_3$ masterbatch available as Omylane G200 from OMYA were fed by gravity into the extruder. The extruder exit was fitted with a 400 mm wide slot die with a gap of 200 $\mu$.

The film was formed by casting onto a matte finish stainless steel roll, which was cooled to approximately 20° C. with chilled water. The final film was wound into a roll at a speed of about 8 m/min and stored in roll form at approximately 22° C. and had a thickness of about 100 microns.

Comparative Example 1

Example 1 was repeated with the exception that the polyethylene of Example 1 having a density of 0.868 (70 parts ENGAGE 8150 from Dow Dupont, denoted as B1) was mixed with polypropylene ( 25 parts Finapro PPH 7060S. from Fina Chemicals, Brussels, Belgium.). and the $CaCO_3$ masterbatch (5 parts Omyalene G 200 from OMYA; Cologne, Germany) Chemical composition and properties of the film are summarized in Table 1.

Comparative Example 2

An extruded film was prepared by the method described in Example 1 using a conventional polyethylene having a density of 0.922 (80 parts Finathene LB 520–0 from Fina Chemicals, Brussels, Belgium) mixed with Polystyrene (20 parts Polystyrol 144 CKG-2 from BASF, Ludwigshafen, Germany).

TABLE 1

Example 1 and comp. 1 contain 5% $CaCO_3$ masterbatch A51

| Example | PE type, parts | PE, density | Fiber-forming polymer type, parts | Perm. set (50%), % in c.d. | Perm. set (100%), % in c.d. | F10[1] (MD) [N] | F10[1] (CD) [N] | F10 ratio | Yield point, [N] in MD[1] | Yield point, % elong in m.d.. |
|---|---|---|---|---|---|---|---|---|---|---|
| Ex. 1 | B1, | 0.863 | F21, 25 | 8 | 20 | 25.6 | 4.15 | 6.16 | 23.5 | 7.3 |
| Comp. 1 | B2 | 0.868 | C25, 25 | 10 | 30 | 8.77 | 6.77 | 1.29 | 7 | 26 |
| Comp. 2 | B6 | 0.922 | F21, 20 | breaks at 12.1% | — | 42.6 | 23.14 | 1.84 | 48.4 | 7.9 |

[1]normalized to 100$\mu$

Examples 2–8

Example 1 was repeated with the exception that the ratio of polyethylene to polystyrene was varied. Results show that at high levels of polystyrene the films lose the desirable elastic behavior in the cross web direction as reflected in increased values of CD permanent set.

Chemical composition and properties of the films are summarized in Table 2.

TABLE 2

All examples contain 5% $CaCO_3$ masterbatch A51

| Example | PE type, parts | PE, density | Fiber-forming polymer type, parts | Perm. set (50%), % in CD. | Perma. set (100%), % in CD | F10[1] [N] (MD) | F10[1] [N] (CD) | F10 ratio | Yield point in MD [N][1] | Yield point in MD, % elong. |
|---|---|---|---|---|---|---|---|---|---|---|
| 2 | B1 | 0.863 | F21 0% | 3 | 5 | 1.75 | 1.65 | 1.06 | 7.7 | 110 |
| 3 | B1 | 0.863 | F21 5% | 4 | 10 | 6.4 | 2.0 | 3.2 | 7.8 | 43.3 |
| 4 | B1 | 0.863 | F21 10% | 4 | 13 | 11.01 | 2.04 | 5.39 | 11.6 | 7.9 |
| 5 | B1 | 0.863 | F21 15% | 6 | 15 | 14.88 | 2.9 | 5.13 | 15 | 7.9 |
| 6 | B1 | 0.863 | F21 20% | 6 | 18 | 19.11 | 3.49 | 5.48 | 20.6 | 6.5 |
| 7 | B1 | 0.863 | F21 25% | 8 | 20 | 21.77 | 4.15 | 5.25 | 23.5 | 7.3 |
| 8 | B1 | 0.863 | F21 30 | 13 | 30 | 27.05 | 7.57 | 3.57 | 29.6 | 7.1 |

[1] normalized to 100$\mu$

Examples 9–17

Examples 9–17 were prepared by the process described in Example 1 using polyethylene having a range of densities (higher Wan in Example 1) in combination with polystyrene. Polyethylenes with different densities were mixed to achieve different densities.

The chemical composition of Examples 9–17 is summarized in Table 3. The physical properties are summarized in Table 4.

TABLE 3

| Example | PE, type, parts, density | PE, type, parts, density | Overall density of the PE | Fiber-forming polymer, type | Fiber-forming polymer, parts |
|---|---|---|---|---|---|
| 9 | B1, 80, 0.863 | — | 0.863 | F21 | 20 |
| 10 | B1, 40, 0.863 | B2, 40, 0.868 | 0.8655 | F21 | 20 |
| 11 | B2, 80, 0.868 | — | 0.868 | F21 | 20 |
| 12 | B2, 40, 0.868 | B3, 40, 0.870 | 0.869 | F21 | 20 |
| 13 | B3, 80, 0.870 | — | 0.870 | F21 | 20 |
| 14 | B3, 40, 0.870 | B4, 40, 0.885 | 0.8775 | F21 | 20 |
| 15 | B4, 80, 0.885 | — | 0.885 | F21 | 20 |
| 16 | B4, 40, 0.885 | B5, 50, 0.908 | 0.8935 | F21 | 20 |
| 17 | B5, 80, 0.908 | — | 0.908 | F21 | 20 |

TABLE 4

| Example | Perm. set CD (50%), % | Perm. set CD (100%), % | F10[1] (MD) [N] | F10[1] (CD) [N] | F10 ratio, | Yield point in MD, [N][1] | Yield point in MD, % elong. |
|---|---|---|---|---|---|---|---|
| 9 | 6 | 18 | 20.88 | 2.93 | 7.07 | 22.4 | 7.2 |
| 10 | 7 | 21 | 21.94 | 3.51 | 6.25 | 23.6 | 7.1 |
| 11 | 8 | 25 | 19.66 | 3.8 | 5.16 | 21.3 | 7.4 |
| 12 | 8 | 25 | 23.45 | 4.0 | 5.86 | 25.5 | 7.1 |
| 13 | 8 | 25 | 21.35 | 3.93 | 5.43 | 23.2 | 7.4 |
| 14 | 12 | 38 | 24.73 | 5.93 | 4.17 | 26.9 | 6.9 |
| 15 | 15 | 45 | 26.46 | 7.95 | 3.33 | 28.8 | 7.4 |
| 16 | 16 | 50 | 30.26 | 10.27 | 2.95 | 33.4 | 7.4 |
| 17 | 18 | 58 | 31.53 | 12.93 | 2.47 | 34.4 | 7.4 |

[1] normalized to 100$\mu$

Example 18

A film was prepared by the method described in Example 1 by mixing polyethylene having a density of 0.870 (80 parts, available as ENGAGE 8100 from Dow DuPont Elastomers SA CH-Geneva, denoted as B3) with a polyamide PA12 (20 parts, available as Grilanid L20 natur from EMS Chemie AG CH-Domat, denoted as F22).

Chemical composition of the film of Example 18 and its physical properties are summarized in Tables 5 and 6, respectively.

Example 19

A film was prepared by the method of Example 1 by mixing polyethylene having a density of 0.863 (80 parts, available as ENGAGE 8180 from Dow DuPont Elastomers SA CH, Geneva, denoted as B1) with polybutylene terephthalate (15 parts available as POCAN B1300 (TM) from Bayer, Leverkusen, Germany, denoted as F23) and $CaCO_3$ masterbatch (5 parts Omyalene G 200 from OMYA, Cologne, Germany denoted as A51).

Chemical composition of the film of Example 19 and its physical properties are summarized in Tables 5 and 6, respectively.

Example 20

A film was prepared by the method of Example 1 by mixing polyethylene having a density of 0.863 (80 parts, available as ENGAGE 8180 from Dow DuPont Elastomers SA CH, Geneva, denoted as B1) with polybutylene terphthalate (15 parts available as POCAN B1501 (TM) from Bayer, Leverkusen, Germany, denoted as F24) and the $CaCO_3$ masterbatch (5 parts Omyalene G 200 from OMYA, Cologne, Germany denoted as A51).

Chemical composition of the film of Example 20 and its physical properties are summarized in Tables 5 and 6, respectively.

TABLE 5 the examples 19 and 20 contain 5% $CaCO_3$ masterbatch A51

| Example | PE, type | PE, parts | PE, density | Fiber-forming polymer, type | Fiber-forming polymer, parts |
|---|---|---|---|---|---|
| 18 | B1 | 80 | 0.870 | F2 | 20 |
| 19 | BI | 80 | 0.863 | F3 | 15 |
| 20 | B1 | 80 | 0.863 | F4 | 15 |

TABLE 6 the examples 19 and 20 contain 5% $CaCO_3$ masterbatch A51

| Example | Perm. set (50%), %, c.d. | Perm. set (100%), %, c.d. | F10[1] (MD), [N] | F10[1] (CD), [N] | F10 ratio, | Yield point in MD[1], [N] | Yield point in MD, % elong. |
|---|---|---|---|---|---|---|---|
| 18 | 7 | 23 | 12.18 | 4.51 | 2.70 | 12.2 | 9.3 |
| 19 | 7 | 10 | 7.59 | 2.69 | 2.82 | 7.7 | 7.9 |
| 20 | 7 | 23 | 7.54 | 2.91 | 2.59 | 7.55 | 8.1 |

[1])normalized to 100μ

Example 21

Polyethylene pellets having a density of 0.868 g/cn³ (70 parts, available as ENGAGE 8150 from Dow DuPont Elastomers, denoted as B2) and polystyrene pellets (25 parts, available as Polystyrol 144 CKG-2 from BASF, denoted as F21) and the $CaCO_3$ masterbatch available as Omylane G200 from OMYA were fed by gravity into the extruder.

Example 21 was repeated with the exception that the extruded film was oriented in the length direction by the following process. The film was first preheated on a rolls with 65° and then the softened film was stretched between two nips, where the second nip was running at a higher speed than the first nip. The film was stretched from 115 micron to 86 microns and then allowed to cool. The film was then wound up upon itself and stored at approx 22° C.:

The properties of the oriented film were measured and compared to the un-oriented film of the same material. The results show that orientation increased the strength of the film in the machine direction (MD). This is expressed by the force at yield normalized to 100μ.

TABLE 7

| Example | Perm. set (50%), %, c.d. | Perm. Set (100%), %, c.d. | F10[1] (MD) [n] | F10[1] (CD), N | F10 ratio, | Yield point in MD[1], [N] | Yield point in MD, % elong. |
|---|---|---|---|---|---|---|---|
| Un-oriented | 5 | 12 | 18.4 | 2.50 | 7.36 | 18.4 | 8.9 |
| Oriented | 6 | 12 | 11.36 | 2.47 | 4.60 | 24.2 | 43 |

[1]normalized to 100μ

We claim:

1. An anisotropic film comprising:

a continuous elastic phase comprising a polyolefin elastomer having a density of less than 0.90 grams per cubic centimeter, and a discontinuous phase oriented within the continuous phase such that the film exhibits anisotropic elastic properties;

wherein the discontinuous phase comprises fiber regions within the continuous phase, which fiber regions are oriented in a substantially parallel direction and the film is elastic in a cross-direction to the direction of the fiber regions orientation such that the film in this cross-direction has a 50 percent permanent set value of less than 20 percent.

2. The film of claim 1, wherein the polyolefin elastomer comprises polyethylene.

3. The film of claim 2, wherein the polyolefin elastomer comprises a polymer derived from monomeric units consisting of polyethylene and one or more comonomer.

4. The film of claim 3, wherein the comonomer comprises a $C_2$–$C_{20}$ alpha olefin.

5. The film of claim 4, wherein the alpha olefin is chosen from the group consisting of propylene, isobutylene, 1-butene, 1-hexene, 4-methyl-1-pentene, 1-heptene, 1-octene, 1-nonene, 1-decene, 2-norborene, and mixtures thereof.

6. The film of claim 1, wherein the discontinuous fibers are comprised of materials chosen from the group consisting of a polystyrene, a polyamide, a polyester, and mixtures thereof.

7. The film of claim 1, wherein the film comprises from about 1 to 40 parts by weight discontinuous phase based on 100 parts by weight film.

8. The film of claim 7, wherein the film comprises from about 20 to 30 parts by weight discontinuous phase based on 100 parts by weight film.

9. The film of claim 1, wherein the film in a machine direction has a yield point of at least 5 newtons.

10. The film of claim 1, wherein the film in a machine direction has a yield point in the range from about 5 to 15 percent elongation.

11. The film of claim 1, wherein the film in a machine direction has an F10 force of at least about 6 newtons.

12. The film of claim 1, wherein the film has an F10 ratio of at least about 1.5.

13. An anisotropic elastic film laminate comprising:

an anisotropic film comprising a continuous elastic phase comprising a polyolefin elastomer having a density of less than 0.90 grams per cubic centimeter and a discontinuous phase oriented within the continuous phase such that the anisotropic film exhibits anisotropic elastic properties and wherein the discontinuous phase comprises fiber regions within the continuous phase, which fiber regions are oriented in a substantially parallel direction and the anisotropic film is elastic in a cross-direction to the direction of the fiber regions orientation such that the anisotropic film in this cross-direction has a 50 percent permanent set value of less than 20 percent and a laminate layer laminated to the anisotropic layer.

14. A personal use garment comprising an anisotropic film comprising:

a continuous elastic phase comprising a polyolefin elastomer having a density of less than 0.90 grams per cubic centimeter and a discontinuous phase oriented within the continuous phase such that the anisotropic film exhibits anisotropic elastic properties and wherein the discontinuous phase comprises fiber regions within the continuous phase, which fiber regions are oriented in a substantially parallel direction and the anisotropic film is elastic in a cross-direction to the direction of the fiber regions orientation such that the anisotropic film in this cross-direction has a 50 percent permanent set value of less than 20 percent.

* * * * *

UNITED STATES PATENT AND TRADEMARK OFFICE
CERTIFICATE OF CORRECTION

PATENT NO.    : 6,270,910 B1
DATED         : August 7, 2001
INVENTOR(S)   : Jaeger, Jobst T.

It is certified that error appears in the above-identified patent and that said Letters Patent is hereby corrected as shown below:

Column 7,
Line 20, please delete "mime" and insert -- minimize --.

Column 8,
Line 66, please delete "Thethe" and insert -- The --.

Column 9,
Line 31, please delete "Dpont" and insert -- DuPont --.
Line 49, please delete "F21" and insert -- F22 --.

Column 10,
Line 8, please delete "Koehn" and insert -- Kehlberg --.

Column 11,
Line 30, please delete "Wan" and insert -- than --.

Column 13,
Line 1, please delete "Grilanid" and insert -- Grilamid --.

Signed and Sealed this

Tenth Day of September, 2002

*Attest:*

JAMES E. ROGAN
*Attesting Officer*     *Director of the United States Patent and Trademark Office*